United States Patent [19]
Samit et al.

[11] Patent Number: 5,443,367
[45] Date of Patent: Aug. 22, 1995

[54] HOLLOW FAN BLADE DOVETAIL

[75] Inventors: Marc Samit, Hartford; Michael A. Weisse, Tolland, both of Conn.

[73] Assignee: United Technologies Corporation, Hartford, Conn.

[21] Appl. No.: 200,128

[22] Filed: Feb. 22, 1994

[51] Int. Cl.⁶ .............................................. F01D 5/30
[52] U.S. Cl. ................................ 416/248; 416/223 A
[58] Field of Search ................. 416/223 A, 248, 95, 416/232, 233

[56] References Cited

U.S. PATENT DOCUMENTS

| | | | |
|---|---|---|---|
| 4,021,138 | 5/1977 | Scalzo et al. | 416/95 |
| 4,815,939 | 3/1989 | Doble | 416/233 |
| 4,898,514 | 2/1990 | McCracken | 416/95 |
| 5,156,526 | 10/1992 | Lee et al. | 416/95 |

FOREIGN PATENT DOCUMENTS 902  1/1991  Japan ................................. 416/233

Primary Examiner—John T. Kwon
Attorney, Agent, or Firm—Marina F. Cunningham

[57] ABSTRACT

A gas turbine engine fan blade having an airfoil portion and a dovetail root portion is enhanced by having spaced apart supporting ribs extend into the dovetail root portion. The supporting ribs define a plurality of hollow cavities extending into the dovetail root portion of the fan blade. The extended cavities reduce the weight of each blade and also improve the integrity of each blade.

6 Claims, 3 Drawing Sheets

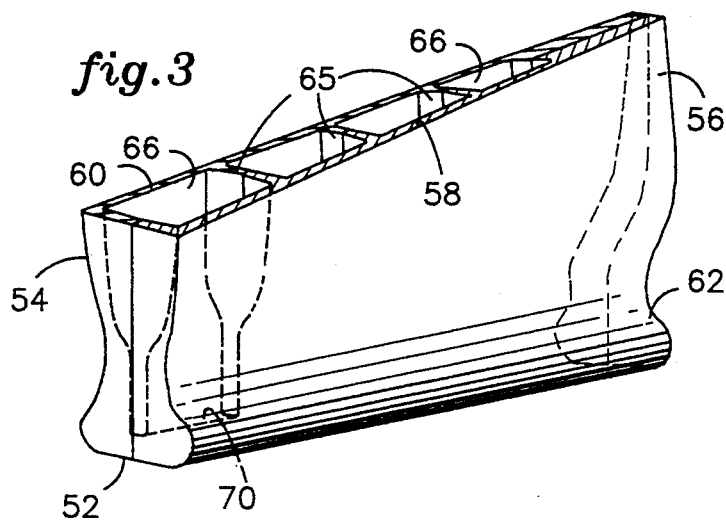
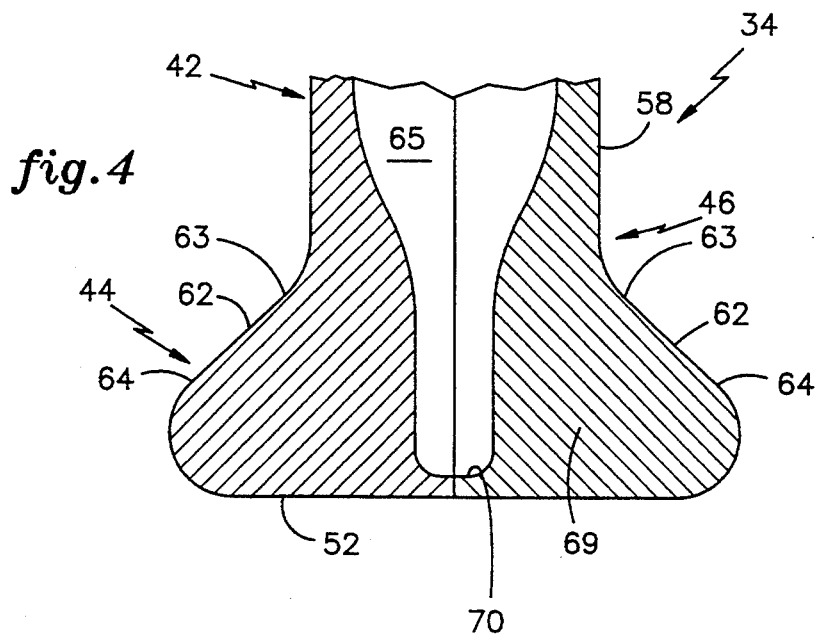
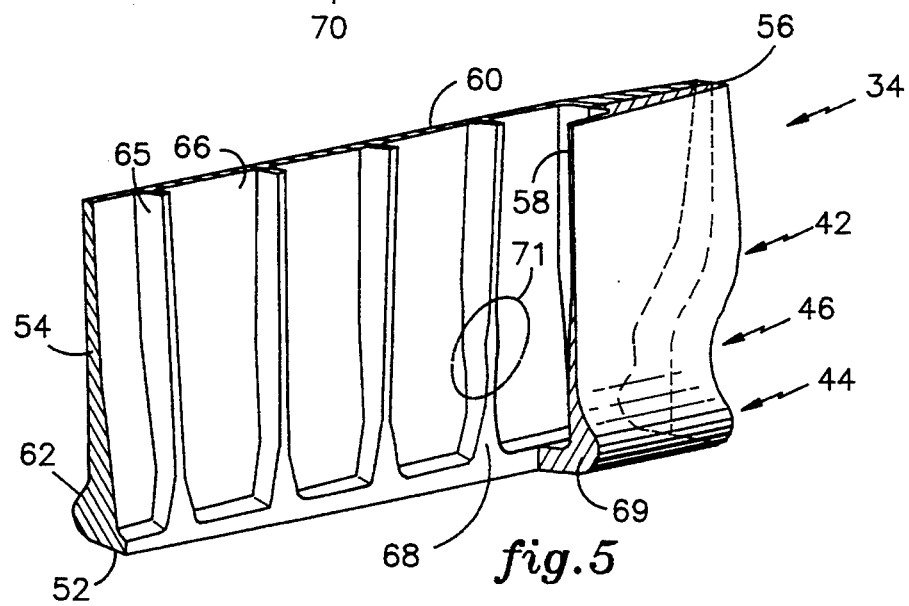

HOLLOW FAN BLADE DOVETAIL

TECHNICAL FIELD

This invention relates to gas turbine engines and, more particularly, to fan blades therefor.

BACKGROUND ART

A turbofan is a widely used type of a gas turbine engine. The distinctive feature of the turbofan engine is an axial flow fan. The discharge air from the fan contributes substantially to the overall thrust of the engine. The amount of thrust generated by an engine with a given core is a function of the size of the fan. Longer fan blades for the given core engine accelerate more air through the fan and correspond to a higher thrust engine.

The fan, disposed in the forward portion of the engine, is enclosed in a duct and equipped with rotating blades and stationary vanes. The fan blades operate in a very hostile environment and therefore must be designed to withstand large loads, impact, and vibrations. Each blade comprises an airfoil portion and a dovetail root portion secured in a fan disk. As the fan rotates at very high speeds, the blades are subjected to extreme centrifugal loads in a radial direction. The centrifugal forces produce large tensile stresses within each blade. The reaction force from the disk which retains the blade manifests itself as a compressive force applied to the dovetail root portion. In order to overcome such an extreme stress load and avoid frequent repairs, each fan blade must meet stringent design criteria. In addition, the blades must be light weight to optimize the efficiency of the engine.

Conventional fan blades are fabricated from titanium and tend to be solid for two reasons. First, the compressive force acting on the fan blade dovetail root may collapse the blade, if it is not made solid. Second, until recently, hollow fan blade fabrication, while desirable from a weight standpoint, has been cost prohibitive. The airfoil portion is fabricated to be very thin in order to minimize the weight of the blades. However, high performance modern engines, producing high levels of thrust, necessarily command a longer blade. A problem arises since very thin, long blades produce vibratory flutter because they cannot support themselves sufficiently. To reduce such flutter problems, mid-span shrouds or braces are placed between the blades in the mid-section thereof. The drawback associated with the mid-span shrouds is that the shrouds form a continuous ring in the mid-section of the fan blade, impending the airflow and thereby reducing efficiency in performance.

One method to eliminate the inefficiency in performance is to remove the mid-span shrouds. The common approach to compensate for the lack of mid-span shrouds and maintain flutter free blades, is to increase the chord length and the thickness of the blade. However, the increase in length and thickness of the blade creates a prohibitive weight penalty in each blade, and subsequently, in the entire engine. Since it is critical for the engine to be as light weight as possible, the airfoil portion of the fan blade is currently hollow. However, another problem arises with such blades. In general, stress concentration is a result of geometrical discontinuity. In hollow fan blades, stress concentrations occur at the transition point between the hollow part of the airfoil and the solid root thereof. When the stress concentration area coincides with an area experiencing high centrifugal loading, the integrity of the fan blade can be jeopardized. In a fan blade having a hollow airfoil portion, the transition area between the hollow airfoil and the solid dovetail root does occur in the area subjected to high centrifugal loading and presents a threat to the integrity of the fan blade. Thus, there is a great need for light weight, aerodynamically efficient and reliable fan blades.

DISCLOSURE OF THE INVENTION

It is an object of the present invention to enhance the efficiency of a fan blade for gas turbine engines.

It is a further object of the present invention to minimize the weight of each fan blade and subsequently to reduce the overall weight of the engine without jeopardizing the performance thereof.

According to the present invention, a hollow fan blade, bounded by a wall structure having a concave wall and a convex wall spaced apart and integrally connected at leading and trailing edges, has an airfoil portion and a dovetail root portion including a plurality of spaced apart supporting ribs extending in the spanwise direction through the airfoil and dovetail root portions of the blade. The supporting ribs may be enlarged in the chordwise direction within the dovetail root portion forming a rib base solidity therein. The concave wall and the convex wall may be enlarged in the thickness direction within the dovetail root portion forming a wall base solidity therein.

A principal advantage of the present invention is that the spaced apart supporting ribs result in hollow cavities within the dovetail root portion and thereby enhance the efficiency of the blade by reducing the overall weight thereof. Another advantage of the present invention is that the integrity of blades is improved because the hollow-to-solid transition area is shifted from a location experiencing high centrifugal loading to the dovetail root portion where the tensile stress is at a minimum. Another advantage of the present invention is that the rib and wall base solidities provide sufficient support to the dovetail root portion to avoid crushing thereof by the compressive force applied by the disk, retaining the dovetail root portion.

These and other objects and advantages of the present invention will become more apparent in light of the following detailed description of a best mode thereof as illustrated in the accompanying drawings.

BRIEF DESCRIPTION OF THE DRAWING

FIG. 3 is a top, perspective, partially sectioned view of a portion of the fan blade of FIG. 2;

FIG. 4 is a front, fragmentary, cross-sectional view of the portion of the fan blade of FIG. 3; and FIG. 5 is a top, sectioned, perspective view of the portion of the fan blade of FIG. 4.

BEST MODE FOR CARRYING OUT THE INVENTION

Figure 1:
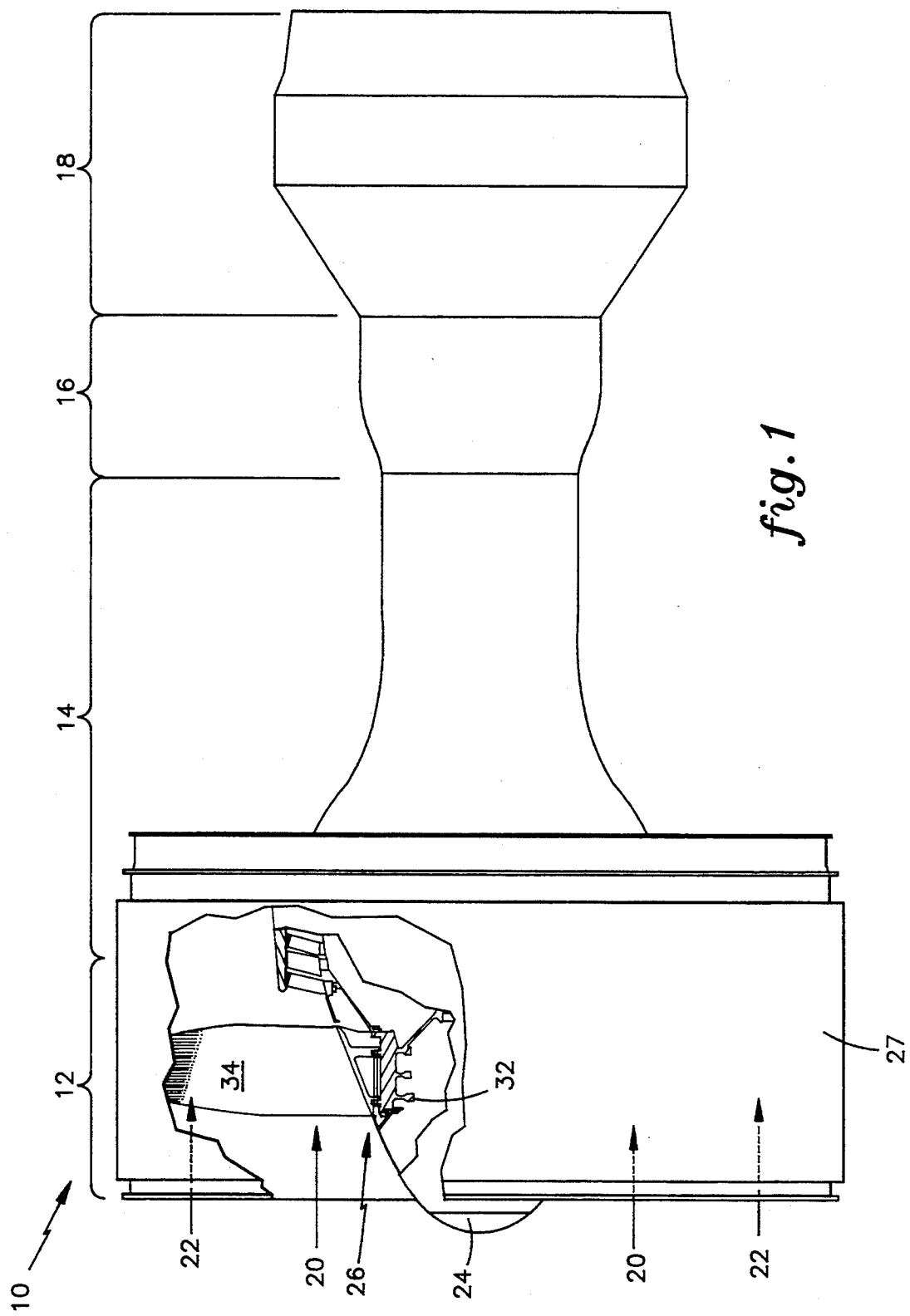
FIG. 1 is a simplified cross-sectional view of a gas turbine engine of the type employing a fan blade of the present invention.

FIG. 1 is a simplified representation of a turbofan gas turbine engine 10 of the type used to propel aircraft. The engine 10 includes a fan section 12, a compressor 14, a combustion section 16, and a turbine 18. Primary air 20 flows axially through the sections 12-18 of the engine, whereas the secondary airflow 22, extending radially outward of the primary airflow 20, passes only through the fan section 12. The fan 12 accelerates the air to contribute to the overall thrust produced by the engine. As is well known in the art, the primary airflow 20, compressed in the compressor 14, is mixed with fuel which is burned in the combustor 16 and expanded in the turbine 18, thereby rotating the turbine 18 and driving the compressor 14 and the fan 12.

Figure 2:
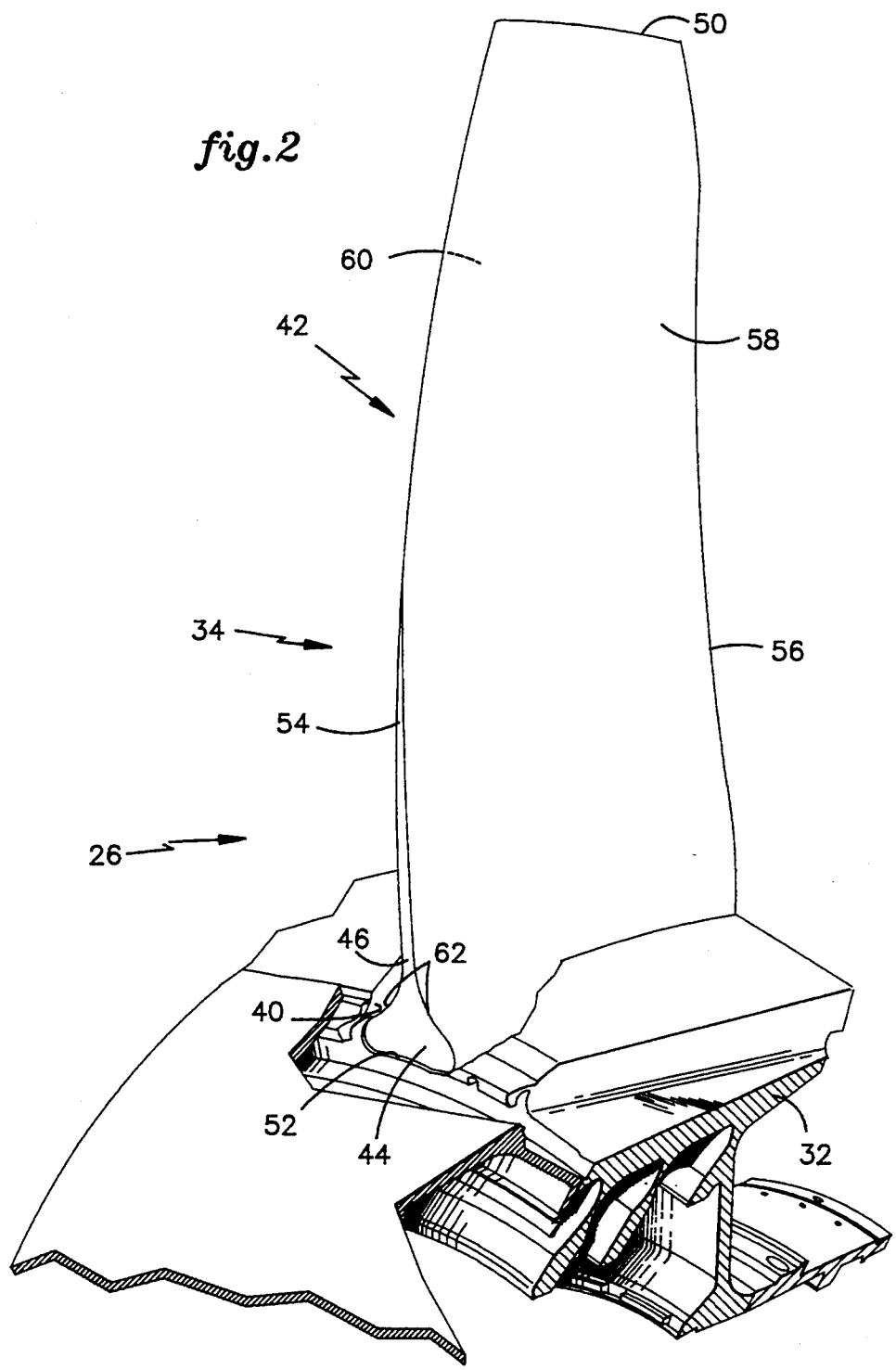
FIG. 2 is a top perspective view of the fan blade mounted within a fan disk, as shown in FIG. 1, according to the present invention.

The fan section 12 includes a spinner 24 and a fan assembly 26 enclosed in a duct 27. The fan assembly 26 comprises a fan disk 32 and a plurality of fan blades 34. The disk 32 includes a plurality of dovetail slots 40 formed within the outer circumference thereof to retain the fan blades 34, as shown in FIG. 2.

Each fan blade 34 comprises an airfoil portion 42 and a dovetail root portion 44 connected by a neck portion 46. Each blade 34 extends in the spanwise direction from a tip 50 to a root 52, in the chordwise direction from a leading edge 54 to a trailing edge 56, and in the thickness direction from a convex wall 58 to a concave wall 60. The convex wall 58 and concave wall 60, extending chordwise, join at the leading edge 54 and at the trailing edge 56. The concave wall 60 and convex wall 58 form a substantially flat load bearing surface 62 in the dovetail root portion 44 of the fan blade 34. The load bearing surface 62 has an outer end portion 63 and an inner end portion 64, as best seen in FIG. 4.

Referring to FIG. 3, a plurality of supporting ribs 65 extend in the spanwise direction from the tip 50 to the root 52 and in the thickness direction connecting the concave and convex walls and defining hollow cavities 66 therebetween. The supporting ribs 65 are enlarged in the chordwise direction within the dovetail root portion to form a rib base solidity 68. The concave wall 60 and convex wall 58 are enlarged in the thickness direction within the dovetail root portion forming a wall base solidity 69 and terminating in a radius 70 therein, as shown in FIG. 4. The radius 70 is disposed below the inner end portion 64 of the load bearing surfaces 62. The supporting ribs 65 are also enlarged in the chordwise direction above the neck portion 46 in region 71, as can be seen in FIG. 5.

During operation of the engine 10, the fan assembly 26 rotates at extremely high speeds, resulting in large centrifugal loading on the fan blades 34 in the spanwise direction. Due to the large centrifugal loading, the concave and convex walls 58, 60 and ribs 65 are subjected to high tensile stress. The tensile stress is relatively high at the neck portion 46 of the blade 34, gradually decreasing toward the root 52 and disappearing below the inner end portion 64 of the load bearing surface 62. To avoid having a transition from the hollow cavities 66 to solidities 68, 69 in high tensile stress area, the radius 70 is disposed below the inner end portion 64 of the load bearing surface 62.

As the fan assembly 26 rotates, the fan blades 34 are retained in the dovetail slots 40 within the disk 32. The restraining action of the disk 32 produces compressive stress in the dovetail root portion 44. The compressive stress acts upon the load bearing surface 62 of the dovetail root portion 44 and can cause collapse thereof if the dovetail root portion is not strong enough. To prevent collapse of the dovetail root portion from the compressive stress, the thickness of concave wall 60, convex wall 58, and the supporting ribs 65 increases toward the root 52 within the dovetail root portion. The compressive force acting upon the load bearing surface 62 also results in a thickness tensile stress that acts in the thickness direction in the region 71 above the neck portion 46. To overcome the thickness tensile stress, the ribs 65 are enlarged in region 71, approximately under 10% of the total spanwise distance of the rib from root to tip. As a guideline, to insure that the fan blades withstand tensile and compressive loads, the total amount of hollow cavity space should not exceed one third of the total blade volume at the neck portion 46. Albeit the number of ribs is not crucial for this invention, at least one third of the total volume within the dovetail root portion in the chordwise direction should be solid and no single hollow cavity should exceed 25% of the total chord length.

While the present invention has been illustrated and described with respect to a particularly embodiment thereof, it should be appreciated by those of ordinary skill in the art, that various modifications to this invention may be made without departing from the spirit and scope of the present invention. For instance, while the specification refers to the root portion of the fan blade as the dovetail, other retention shapes for the airfoil, such as a fir-tree shape, may have equal utility. Furthermore, the number of supporting ribs is not critical to the present invention and can be varied depending on the particular requirements. Also, the numerical values for the total amount of hollow cavity space are a mere guideline and reflect the best operating mode, rather than a limitation on the present invention.

We claim:

1. A gas turbine engine fan blade comprising an airfoil portion bounded by a wall structure having a concave wall and a convex wall spaced apart and integrally joined by a trailing edge and a leading edge, said airfoil portion having a plurality of spaced apart supporting ribs extending radially in a spanwise direction and connecting said convex wall and said concave wall in thickness direction, said airfoil portion terminating in a tip on a first end thereof and having a dovetail root portion formed on a second end of said airfoil portion of said fan blade, said spaced apart supporting ribs extending into said dovetail root portion of said fan blade, said supporting ribs defining hollow cavities therebetween, said hollow cavities terminating in a hollow-to-solid transition within said dovetail portion thereof.

2. A fan blade of claim 1 wherein said supporting ribs are enlarged in the chordwise direction within said dovetail root thereof to reinforce said dovetail root portion, thereby enhancing strength thereof.

3. A fan blade of claim 2 wherein said hollow cavities within said dovetail root portion do not constitute more than one third of total blade volume to withstand stress loads acting thereupon.

4. A fan blade of claim 1 wherein said concave wall and said convex wall are enlarged within said dovetail root portion thereof to reinforce said dovetail root portion, thereby enhancing strength thereof.

5. A fan blade of claim 1 wherein said supporting ribs are enlarged above said dovetail root portion thereof to reinforce said supporting ribs, thereby overcoming the thickness tensile stress.

6. A fan blade of claim 1 wherein said concave wall and said convex wall form a load bearing surface on an upper end of said dovetail root portion, said load bearing surface having an outer end portion and an inner end portion, said concave wall and said convex wall are enlarged within said dovetail root portion forming a hollow-to-solid transition area, and said transition area is disposed below said inner end portion of said load bearing surface.

* * * * *